Dec. 22, 1942.  W. Y. ROBB  2,306,280
STOPPING MECHANISM FOR AXMINSTER LOOMS
Filed May 7, 1942  2 Sheets-Sheet 1
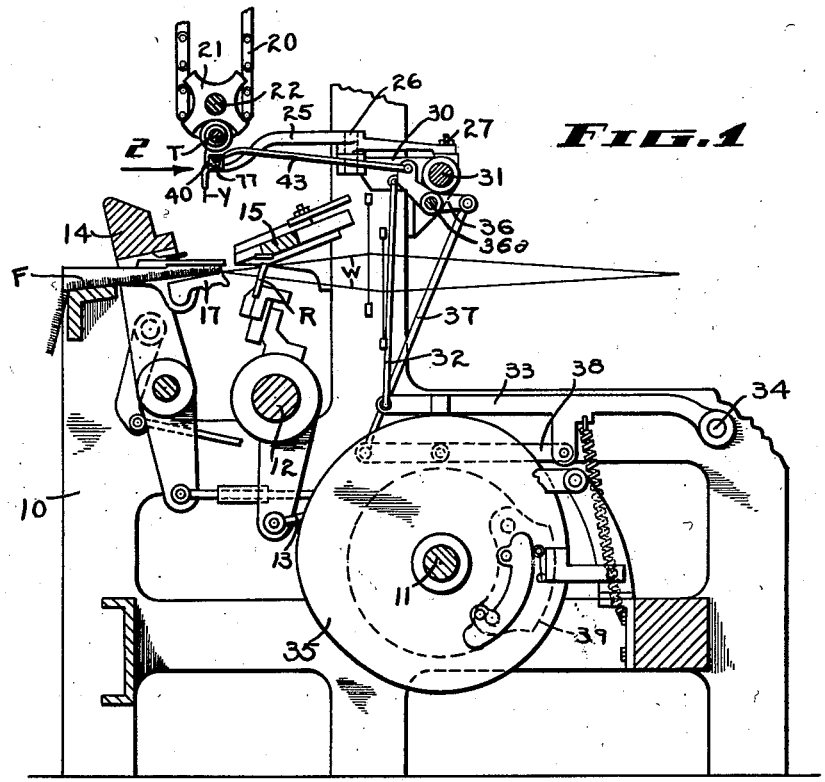
INVENTOR
WALTER Y. ROBB
By Chas. T. Hawley
ATTORNEY

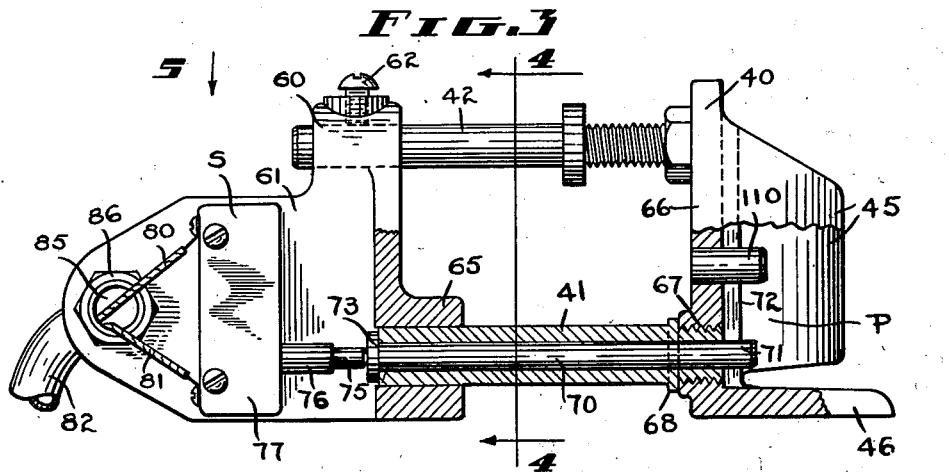

Patented Dec. 22, 1942

2,306,280

UNITED STATES PATENT OFFICE 2,306,280

STOPPING MECHANISM FOR AXMINSTER LOOMS

Walter Y. Robb, Whitinsville, Mass., assignor to Crompton & Knowles Loom Works, Worcester, Mass., a corporation of Massachusetts Application May 7, 1942, Serial No. 442,050

12 Claims. (Cl. 139—336)

This invention relates to improvements in Axminster looms and it is the general object of the invention to provide the tube frame transfer clutches with electrical switches in circuit with stopping means to stop the loom if the clutch fails to register correctly with the tube frame in transfer position.

Axminster looms operate in a series of tube frames which are transported by endless chains and arrive one by one at a transfer position. Transfer arms detach the tube frame in transfer position from the chains and move it toward the cloth for a pile tuft forming operation, after which the tube frame is returned to the chain. The tube frames are held to the transporting chains by hooks which are moved from holding to non-holding position with respect to the chains by clutches mounted on the ends of the transferrer arms.

In Axminster looms operating at high speeds there is a tendency for the tube frames to assume abnormal positions in which they cannot be properly engaged by the transfer clutches. It is an important object of my present invention to provide the transfer clutches with electric switch controlling means to be operated by a tube frame when the latter is properly aligned with the clutches. If there is misregister between the clutches and the tube frame the latter is not able to engage the means and electromagnetic stopping mechanism is caused to stop the loom.

The transfer clutches customarily have two studs one of which passes through a bearing on the transfer arms and the other of which has connection with a link operative to rock the clutch and the tube frame around the first stud. It is another object of my present invention to attach an electric switch supporting carrier to these studs so that the switch is at all times in proper relationship with respect to its clutch.

It is another object of my present invention to mount an electric switch controlling plunger within the clutch stud which rotates within the transfer arm bearing. One end of the plunger has a head which projects into the tube frame receiving pocket of the clutch for engagement with the tube frame while the other end has operating relation with respect to the switch.

Because of the proportions of the tube frame and the clutch it is possible for the latter to engage the tube frame in such positions as might operate the switch but would not be proper for a tuft forming operation. It is another object of my present invention to provide the clutch with detector means for engagement with the tube frame if the latter is misplaced and prevent actuation of the switch. In this feature of my invention the detector means on the clutch projects farther into the clutch pocket than the aforesaid plunger head. If the tube frame is properly placed the detector enters a cavity in the tube frame and permits the clutch to have its full motion, thereby enabling the tube frame to operate the switch. If, on the other hand, the tube frame is out of register with the clutch it will engage the detector before engaging the plunger head and the latter, being unmoved by the tube frame, will permit the switch to operate electric loom stopping mechanism.

With these and other objects in view which will appear as the description proceeds, my invention resides in the combination and arrangement of parts hereinafter described and set forth.

In the accompanying drawings, wherein a convenient embodiment of my invention is set forth, Fig. 1 is an end elevation of a portion of an Axminster loom having my invention applied thereto, Fig. 2 is an enlarged front elevation looking in the direction of arrow 2, Fig. 1, showing a tube frame properly engaged with the transferring clutches, Fig. 3 is a vertical section through one of the clutches showing the latter prior to engagement with the tube frame, Fig. 4 is a vertical section on line 4—4 of Fig. 3, Fig. 5 is a plan view looking in the direction of arrow 5, Fig. 3, Fig. 6 is a diagrammatic view showing the loom controlling circuit and its relation to my invention, and Fig. 7 is an enlarged section on line 7—7 of Fig. 5.

Referring to Fig. 1, I have shown a loom frame 10 having a bottom shaft 11 which in the present instance rotates once in three picks or beats of the loom. The loom is provided with a lay shaft 12 carrying a reed R which is given a forward beating up motion to the left as viewed in Fig. 1 each pick of the loom by a force derived from shaft 11 and transmitted through a rod 13 operated in the usual manner. Front and back knife bars 14 and 15, respectively, sever the yarns Y from the tube frame T when the latter is in pile tuft forming position adjacent to the cloth being woven. A cloth board 17 supports the cloth F which extends forwardly from the warp shed W.

The tube frame transporting chains 20 have a series of tube frames T attached thereto and are advanced step by step by sprockets 21 on a pull-over shaft 22. The shaft 22 is operated in any approved manner and has a rocking motion every third pick of the loom to move a new tube frame to transfer position under the shaft 22 in readiness for removal from the chains and movement to tuft forming position.

Each end of the loom has a tube frame transfer arm 25 mounted on a vertical pivot 26 around which it is rocked by a link 27. Each link 27 has a motion laterally of the loom to move its transfer arm from normal position inwardly toward the tube frame in transfer position. The vertical pivot 26 is mounted on lever 30 secured to a dipping shaft 31 which is given an angular motion in a left hand direction as viewed in Fig. 1 every third pick of the loom to lower the tube frame held by the clutches. Each lever 30 is connected by a rod 32 to a dipping lever 33 pivoted at 34 to the loom frame. A cam 35 on shaft 11 cooperates with lever 33 to permit lowering of lever 30. Levers 36 are secured to a shaft 36a journaled on the loom frame. A rod 37 connects one of the levers 36 to a cam lever 38 positioned for actuation by a cam 37 on shaft 11.

The forward end of each transfer arm 25 is provided with a clutch 40 having a lower stud 41 which is rockably mounted in the adjacent transfer arm 25. Each clutch is also provided with a second stud 42 above stud 41 and connected to a link 43 which extends rearwardly for connection to the corresponding rocking lever 36. The purpose of rod 43 and the parts connecting it to the cam 39 is to rock the clutch about stud 41 when the tube frame is in low position for the purpose of rolling in the tuft yarns Y which project from the tube frame. Each clutch may have a pair of lateral wings 45 for engagement with the side walls of the tube frame in transfer position and is also provided with a tongue 46 on which the tube frame rests. The wings and tongue form a tube frame receiving pocket P normally having close fitting relation with the tube frame to position it correctly.

The tube frame comprises an elongated body 48 from which project the tuft guiding tubes 49 through which the tuft yarns Y extend. Each end of the tube frame bar is provided with a bracket 50 having a hook 51 pivoted thereon for cooperation with the corresponding transporting chain. The usual yarn spool 52 is mounted for rotation on the brackets 50 and supplies the tuft yarns which pass through the tubes 49.

Under normal conditions the hooks 51 will be supported by the transporting chains to hold the tube frame under the pull-over shaft in transfer position and the transferrer arms will be in their out or inoperative position. In preparation for a tuft forming operation the arms 25 will be moved inwardly to the position shown in Fig. 2, the upper part of each clutch engaging the corresponding hook 51 to disengage it from the adjacent chain. This latter operation will occur if the tube frame is properly positioned so that it can be detached from the chains and moved downwardly toward the cloth. The matter thus far described, except as noted hereinafter, is of common construction and operates in the usual manner.

In carrying my present invention into effect I provide means whereby misregister of the tube frame with either of the clutches will cause loom stoppage through electrically operated mechanism. Since each clutch is provided with my invention I will describe but one clutch and associated parts. Referring more particularly to Fig. 3 it will be seen that the stud 42 is extended somewhat beyond its usual length to enter a hub 60 formed on the upper part of the switch carrier 61. A set screw 62 holds the stud 42 and switch carrier in fixed position. The lower part of the switch carrier is provided with a second hub 65 into which the left end of the stud 41 projects as viewed in Fig. 3. The right end of stud 41 may be threaded into the clutch web 66 as at 67 and has a shoulder 68 which limits motion of the stud 41 to the right, Fig. 3, with respect to the clutch.

The stud 41 is hollow and has extending therethrough a plunger 70, the head end 71 of which projects beyond the tube frame engaging ledges or surfaces 72 on the web 66 and into the tube frame receiving pocket P. The left end of the plunger as seen in Fig. 3 is provided with a head 73 formed for engagement with the adjacent end of the stud 41. The head 73 is held against stud 41 by a spring plunger 75 which in the present instance is carried by the electric switch designated at S. The plunger 75 is movable in a sleeve 76 rigid with the body 77 of the switch S and is normally extended to the right, Fig. 3. The switch may be of any convenient form and is connected to wires 80 and 81 which extend from a flexible conductor 82 having a head 83 with a threaded end 84 which projects through an opening 85 formed in a left hand extension of the switch carrier 61, as seen in Fig. 3. A nut 86 located on that side of the switch carrier opposite the head 83 holds the latter tightly in position on the carrier 61.

In Fig. 6 I show diagrammatically an electric circuit by means of which the switches S can control the loom. In this circuit each switch is connected by a wire 80 to the ground and each wire 81 of the switches is connected to a wire 90. A periodically operating switch PS has a fixed electrode 91 positioned for engagement with a swinging arm 92 operated by a cam 93 on shaft 11. Cam 93 has a high point 94 which engages a roll 95 on the arm 92 to cause closure of switch PS at three-pick intervals coinciding with the inward movement of the transfer arms 25 for detachment of the tube frame in transfer position from its transporting chains. The switch arm 92 is connected by wire 96 to a source of electric power 97 and the latter is connected by wire 96 to a source of electric power 97 and the latter is connected by wire 98 to some form of electromagnetic loom stopping mechanism designated generally at 99. One side of the mechanism 99 is grounded by wire 100.

Under normal conditions each spring plunger 75 of each switch S moves its associated plunger 70 toward the corresponding clutch so that the head 71 will project into its pocket P in the path of a tube frame which is to be engaged by the clutch. If the tube frame is properly positioned it will engage the heads 71 and push the plungers 70 outwardly, thereby breaking the normally closed contact in the switches S and current cannot flow in the circuit shown in Fig. 6. If for any reason either end of the tube frame should not register with its clutch the corresponding plunger 70 will not be moved and the associated switch S will remain closed. Assuming that the right hand switch S has not been operated due to faulty position of the right end of the tube frame, current will flow from the ground, wire 80, right hand switch S, wire 81, wire 90, contact 91, arm 92 (which at this time has been thrown against contact 91), wire 96, source of electric power 97, wire 98, electro-magnetic stopping mechanism 99 and wire 100 back to the ground. Current flowing in this circuit will operate the mechanism 99 to stop the loom. In similar manner, the loom would have been stopped had the left hand switch remained closed, due to faulty position of the left end of the tube frame, and it is equally obvious that the loom would be stopped if both switches S remained closed due to faulty position of both ends of the tube frame. Cam 93 is so constructed that spring 101 will open the contact of spring PS shortly after the period during which the plungers 70 detect the position of the tube frame.

In order to provide a high degree of accuracy in the operation of the plungers 70 I may employ means which require correct registry of each end of the tube frame with its clutch before the tube frame can engage the head 71. To this end I secure a pin 110 to the vertical wall 66 of each clutch and project it beyond the head 71, as shown in Fig. 3, so that the pin projects farther into pocket P than does head 71 of plunger 70. The pin 110 is adapted for registry with an opening 111 in the tube frame slightly larger than the pin 110 and so located that it cannot be entered by the pin unless the tube frame is correctly located with respect to the clutch. If opening 111 at either end of the tube frame is out of register with its pin 110 the tube frame cannot move far enough into the corresponding pocket to engage the head 71 of the adjacent plunger 70. The latter therefore will remain unmoved and the loom will be stopped as already described. While the pins 110 are desirable to insure a high degree of accuracy in the operation of my invention, they are not necessary for all features of the invention inasmuch as the plungers 70 can perform their functions even though the pins 110 be absent.

The switch S shown on each of the carriers is preferably a commercial form made under Patent No. 1,960,020. The body 77 is made of insulating material and has a contact 116 connected to wire 80 to engage a leaf spring contact 117 connected to wire 81. A button head 118 having a stem 119 slidable in the casing 77 is movable inwardly against the spring 117 to move the latter out of contact with contact 116. The plunger 75 comprises outer and inner tubes 120 and 121, respectively, within which is located a relatively stiff compression spring 122. Stop shoulders 123 on the tubes limit their separation under action of the spring. A head 124 is positioned for engagement with the plunger 70 and is secured to the outer tube after the inner tube and spring have been placed as indicated in Fig. 7.

The shell 76 has feet 125 embedded into the body 77 and has shoulders 126 to limit movement of the plunger 75 away from the body 77. The tubes 120 and 121 form in effect a yieldable capsule movable toward and from the stem 119, and the spring 117 normally holds the stem in outward position to force the head 124 against the plunger 70. Spring 122 is strong enough to move spring 117, but thereafter compresses as plunger 70 continues to move toward the switch.

While I have illustrated one form for the switch S I do not wish necessarily to be limited to it, but the form shown in Fig. 7 has operated satisfactorily in practice.

Inasmuch as my invention relates more particularly to the clutch and mechanism carried by it I have not thought it necessary to describe the details of the stopping mechanism for the loom. The mechanism designated generally at 99 in Fig. 6 may be of any approved form, or may correspond to similar mechanism shown in co-pending application to Dacey Serial No. 424,457, filed December 26, 1941.

From the foregoing it will be seen that I have provided an improved form of loom stopping mechanism employing a clutch on which is mounted a switch the operation or non-operation of which determines whether the loom shall continue to run. It will also be seen that the plungers 70 are mounted to slide through the studs 41 which are customary parts of the usual Axminster loom. Furthermore, the top and bottom studs 42 and 41 afford support for the switch carriers 61, and the latter may be provided with the openings 85 to receive the cables 82 which carry the wires 80 and 81. The pins 110 may be used as an additional precaution to insure a high degree of accuracy, and when used, they will project beyond the plunger heads 71 to protect the latter and prevent their operation by a misplaced tube frame. Furthermore, the plunger head 75 carried by the switch S is the means in the present instance by which the plunger 70 is held normally in its detecting position. I do not wish, however, to be held to this latter feature in the practice of my invention.

Having thus described my invention it will be seen that changes and modifications may be made therein by those skilled in the art without departing from the spirit and scope of the invention and I do not wish to be limited to the details herein disclosed, but what I claim is:

1. An Axminster loom tube frame clutch having a tube frame receiving pocket and adapted for support on a transfer arm, a stud on said clutch to mount the latter pivotally on the transfer arm, a second stud on said clutch by which the latter may be turned around the axis of the first stud, a switch carrier mounted on said studs, an electric switch mounted on said carrier, and means having a part extending into said pocket for engagement by a tube frame to operate the switch.

2. An Axminster loom tube frame clutch having a tube frame receiving pocket and adapted for support on a transfer arm, a primary stud on said clutch to provide pivotal support for the latter on the transfer arm, a secondary stud on said clutch by which the latter may be turned around the axis of the primary stud, a switch carrier mounted on said studs, an electric switch mounted on said carrier, and means projecting into said pocket for engagement by a tube frame and extending along one of said studs to operate said switch.

3. An Axminster loom tube frame clutch having a tube frame receiving pocket and adapted for support on a transfer arm, a primary stud on said clutch by which the latter is pivotally mounted on said transfer arm, a secondary stud on said clutch by which the latter is turned about the axis of the primary stud, a carrier positioned by said studs, an electric switch mounted on said carrier to control said loom stopping mechanism, and an operator for said switch projecting into said pocket for engagement by a tube frame and extending through one of said studs.

4. An Axminster loom tube frame clutch having a tube frame receiving pocket and adapted for support on a transfer arm, a pivot stud for said transfer arm secured to the clutch, a switch carrier, means cooperating with the stud to hold the carrier in fixed position with respect to the clutch, an electric switch mounted on the carrier, and an operator for the switch extending through said stud and projecting into said pocket for engagement with the tube frame.

5. An Axminster loom tube frame clutch having a tube frame receiving pocket and adapted for support on a transfer arm, a stud on said clutch to support the latter on said transfer arm, a plunger slidably mounted within said stud and having one end extending into said pocket for engagement with the tube frame, and an electric switch held in fixed position with respect to the clutch for operation by the other end of said plunger.

6. An Axminster loom tube frame clutch having a tube frame receiving pocket and adapted for support on a transfer arm, a stud on said clutch to support the latter on said transfer arm, a carrier held in fixed position with respect to said clutch, an electric switch on said carrier, and an operator for said switch extending through said stud and extending into said pocket for engagement with the tube frame.

7. An Axminster loom tube frame clutch having a tube frame receiving pocket and adapted for support on a transfer arm, a stud on said clutch to support the latter on said transfer arm, a carrier held in fixed position with respect to said clutch, an electric switch on said carrier, an operator for said switch extending through said stud and extending into said pocket for engagement with the tube frame, and a head on said plunger for engagement with the stud to limit movement of said plunger into the pocket.

8. An Axminster loom tube frame clutch having a tube frame receiving pocket and adapted for support on a transfer arm, a primary stud on said clutch for the transfer arm, a secondary stud on said clutch spaced from the primary stud, a carrier positioned by said studs, an electric switch on said carrier, an operator for said switch extending into said pocket a given distance for engagement by a tube frame, and a detector for a tube frame fixed with respect to the clutch and extending into said pocket a distance greater than said given distance to prevent a misplaced tube frame from engaging said operator.

9. An Axminster loom tube frame clutch having a tube frame receiving pocket and adapted for support on a transfer arm, a pivot stud for said transfer arm secured to the clutch, a switch carrier, means cooperating with the stud to hold the carrier in fixed position with respect to the clutch, an electric switch mounted on the carrier, an operator for the switch extending through said stud and projecting into said pocket for engagement with the tube frame, and a tube frame detector fixed with respect to the clutch and extending into said pocket a distance greater than the distance by which said operator extends into the pocket to prevent a misplaced tube frame from engaging said operator.

10. A clutch for a tube frame having a detector receiving opening therein, means on said clutch defining a pocket to receive that part of the tube frame having the detector opening therein, a detector member secured to the clutch and projecting into said pocket a given distance for registry with said opening in the tube frame, a plunger movably mounted with respect to the clutch and extending into said pocket a distance less than that by which the detector member extends into said pocket but in position for engagement with a tube frame the detector opening of which registers with said detector member, and an electric switch fixed with respect to said clutch and positioned for operation by said plunger.

11. A clutch for a tube frame having a detector receiving opening therein, means on said clutch defining a pocket to receive that part of the tube frame having the detector opening therein, a detector pin secured to said clutch and extending a given distance into said pocket to enter the opening of a tube frame properly positioned with respect to the clutch but positioned to engage an improperly positioned tube frame and limit movement thereof into said pocket, an electric switch fixed with respect to said clutch, and an operator for said switch mounted for movement with respect to the clutch by a tube frame the detector opening of which has been entered by said detector pin, said operator extending into said pocket a distance less than said given distance.

12. An Axminster loom tube frame clutch having a tube frame receiving pocket, an electric switch supported by the clutch, an operator for the switch movably mounted on the clutch and projecting into said pocket for engagement by a tube frame, and means on the clutch to prevent a misplaced tube frame from engaging said operator.

WALTER Y. ROBB.